United States Patent
Kang et al.

(10) Patent No.: US 9,882,692 B2
(45) Date of Patent: Jan. 30, 2018

(54) METHOD AND APPARATUS FOR CONFIGURING QCL BETWEEN ANTENNA PORTS FOR MASSIVE MIMO IN A WIRELESS COMMUNICATION SYSTEM

(71) Applicant: LG ELECTRONICS INC., Seoul (KR)

(72) Inventors: Jiwon Kang, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 14/767,234

(22) PCT Filed: Oct. 10, 2013

(86) PCT No.: PCT/KR2013/009047
§ 371 (c)(1),
(2) Date: Aug. 11, 2015

(87) PCT Pub. No.: WO2014/129716
PCT Pub. Date: Aug. 28, 2014

(65) Prior Publication Data
US 2016/0006547 A1     Jan. 7, 2016

Related U.S. Application Data

(60) Provisional application No. 61/767,251, filed on Feb. 21, 2013.

(51) Int. Cl.
*H04L 5/00*     (2006.01)
*H04B 7/0413*     (2017.01)
(Continued)

(52) U.S. Cl.
CPC ......... *H04L 5/0048* (2013.01); *H04B 7/0413* (2013.01); *H04L 5/0035* (2013.01);
(Continued)

(58) Field of Classification Search
None
See application file for complete search history.

(56) References Cited

U.S. PATENT DOCUMENTS

| | | | |
|---|---|---|---|
| 2013/0003788 A1* | 1/2013 | Marinier | H04B 7/024 375/219 |
| 2013/0114425 A1* | 5/2013 | Sayana | H04B 7/024 370/252 |

(Continued)

FOREIGN PATENT DOCUMENTS

| | | |
|---|---|---|
| CN | 102291213 A | 12/2011 |
| CN | 102754357 A | 10/2012 |

OTHER PUBLICATIONS

3GPP "Corrections on PDSCH RE mapping and QCL", St. Julian's, Malta, Jan. 28-Feb. 1, 2013, submitted as prior art by the applicant.*
(Continued)

*Primary Examiner* — Raj Jain
*Assistant Examiner* — Jamaal Henson
(74) *Attorney, Agent, or Firm* — Birch, Stewart, Kolasch & Birch, LLP

(57) ABSTRACT

A method for receiving a Reference Signal (RS) at a User Equipment (UE) in a wireless communication system is disclosed. The method includes receiving information about a plurality of RSs through a high layer, and receiving the RS based on the information about the plurality of RSs from at least one node. The information about the plurality of RSs includes information indicating whether it is possible to assume quasi co-location between at least two RSs of the plurality of RSs.

8 Claims, 12 Drawing Sheets

(51) Int. Cl.
*H04W 72/04* (2009.01)
*H04W 88/02* (2009.01)

(52) U.S. Cl.
CPC ....... *H04L 5/0094* (2013.01); *H04W 72/0406* (2013.01); *H04W 88/02* (2013.01)

(56) References Cited

U.S. PATENT DOCUMENTS

| | | | |
|---|---|---|---|
| 2013/0188558 A1* | 7/2013 | Nam | H04W 24/02 370/328 |
| 2013/0244676 A1* | 9/2013 | Koivisto | H04L 5/0048 455/452.1 |
| 2013/0279437 A1* | 10/2013 | Ng | H04W 48/16 370/329 |
| 2014/0036800 A1* | 2/2014 | Frenne | H04L 5/0035 370/329 |

OTHER PUBLICATIONS

CATT, "Corrections on PDSCH RE mapping and QCL," 3GPP TSG RAN WG1 Meeting #72, Jan. 28-Feb. 1, 2013, 2 pages, R1-130120.
Huawei et al., "Remaining issues for antenna ports quasi-collocation," 3GPP TSG RAN WG1 Meeting #70bis, Oct. 8-12, 2012, 5 pages, R1-124071.
LG Electronics, "Signaling for CRS-to-CSI-RS quasi co-location assumptions," 3GPP TSG RAN WG1 Meeting #71, Nov. 12-16, 2012, pp. 1-4, R1-124974.
Samsung, "Remaining issues on EPDCCH DM-RS quasi co-location behaviour," 3GPP TSG-RAN WG1#71 meeting, Nov. 12-16, 2012, pp. 1-2, R1-124912.
ZTE, "Need for quasi-co-location signaling for CSI-RS and CRS," 3GPP TSG RAN WG1 Meeting #71, Nov. 12-16, 2012, pp. 1-4, R1-124824.

* cited by examiner

FIG. 2
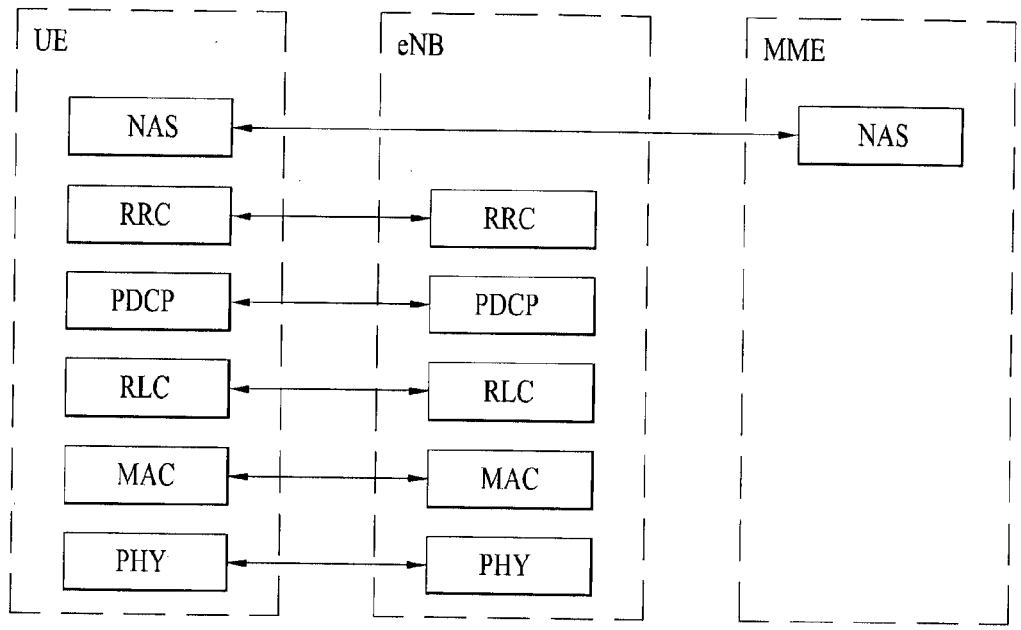
(a) CONTROL-PLANE PROTOCOL STACK
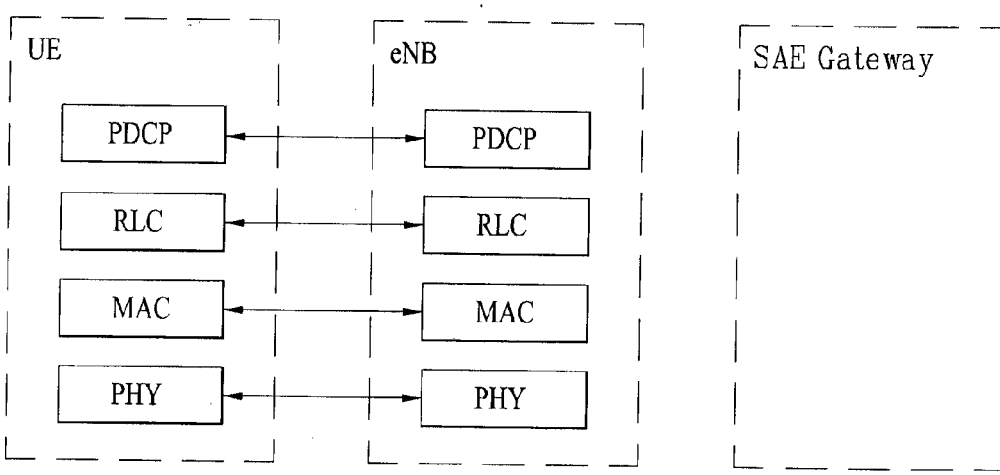
(b) USER-PLANE PROTOCOL STACK

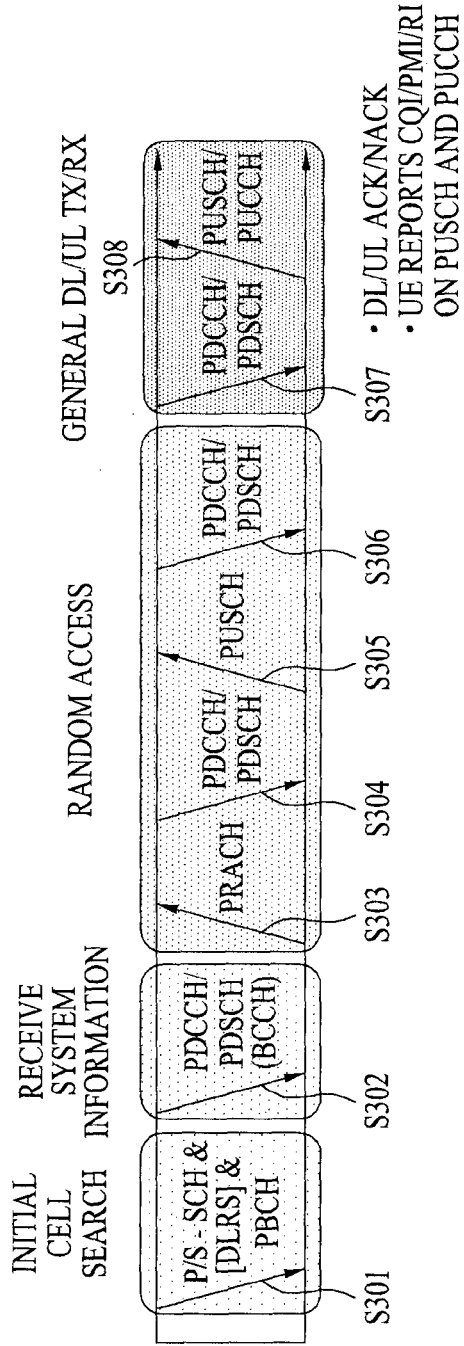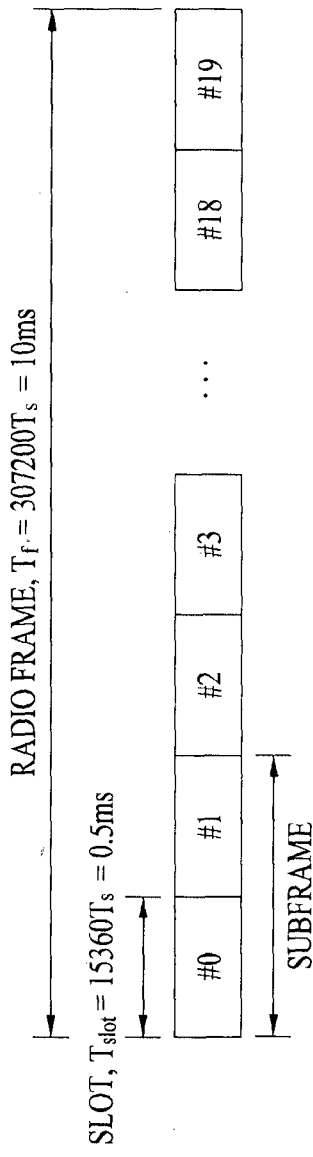

▨ : DMRS GROUP 1

▨ : DMRS GROUP 2

(a): CONVENTIONAL ANTENNA SYSTEM (b): AAS

METHOD AND APPARATUS FOR CONFIGURING QCL BETWEEN ANTENNA PORTS FOR MASSIVE MIMO IN A WIRELESS COMMUNICATION SYSTEM

CROSS REFERENCE TO RELATED APPLICATIONS

This application is the National Phase of PCT International Application No. PCT/KR2013/009047, filed on Oct. 10, 2013, which claims priority under 35 U.S.C. 119(e) to U.S. Provisional Application No. 61/767,251, filed on Feb. 21, 2013, all of which are hereby expressly incorporated by reference into the present application.

TECHNICAL FIELD

The present invention relates to a wireless communication system, and more particularly, to a method and apparatus for configuring Quasi Co-Location (QCL) between antenna ports for massive Multiple Input Multiple Output (MIMO) (i.e. MIMO with a large number of antennas) in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARD) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies on a method and apparatus for configuring Quasi Co-Location (QCL) between antenna ports to implement massive Multiple Input Multiple Output (MIMO) in a wireless communication system.

Technical Solution

The object of the present invention can be achieved by providing a method for receiving a Reference Signal (RS) at a User Equipment (UE) in a wireless communication system, including receiving information about a plurality of RSs through a high layer, and receiving the RS based on the information about the plurality of RSs from at least one node. The information about the plurality of RSs includes information indicating whether it is possible to assume quasi co-location between at least two RSs of the plurality of RSs.

In another aspect of the present invention, provided herein is a method for transmitting an RS to a UE by a network in a wireless communication system, including transmitting information about a plurality of RSs to the UE through a high layer, and transmitting the RS based on the information about the plurality of RSs to the UE through at least one node. The information about the plurality of RSs includes information indicating whether it is possible to assume quasi co-location between at least two RSs of the plurality of RSs.

If it is possible to assume quasi co-location between at least two RSs of the plurality of RSs, the UE may assume that the at least two RSs have a same large-scale property. The large-scale property may include at least one of Doppler spread, Doppler shift, average delay, and delay spread.

The RS may be a Channel State Information Reference Signal (CSI-RS).

The at least two RSs assumed to be quasi co-located may be transmitted through the same node.

One of the at least two RSs may be a default RS, and the information indicating whether it is possible to assume quasi co-location between the at least two RSs of the plurality of RSs may include information indicating whether it is possible to assume that another RS of the at least two RSs is quasi co-located with the default RS.

The information about the plurality of RSs may include resource configuration information about each of the plurality of RSs, the resource configuration information having a specific field for quasi co-location assumption, and if the specific fields of the resource configuration information about at least two RSs are same, it may be possible for the UE to assume that the at least two RSs are quasi co-located.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

Advantageous Effects

According to embodiments of the present invention, QCL can be efficiently configured between antenna ports for massive MIMO in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

FIG. 3 illustrates physical channels and a general signal transmission method using the physical channels in a 3GPP system;

FIG. 4 illustrates a structure of a radio frame in a Long Term Evolution (LTE) system;

BEST MODE

Figure 1:
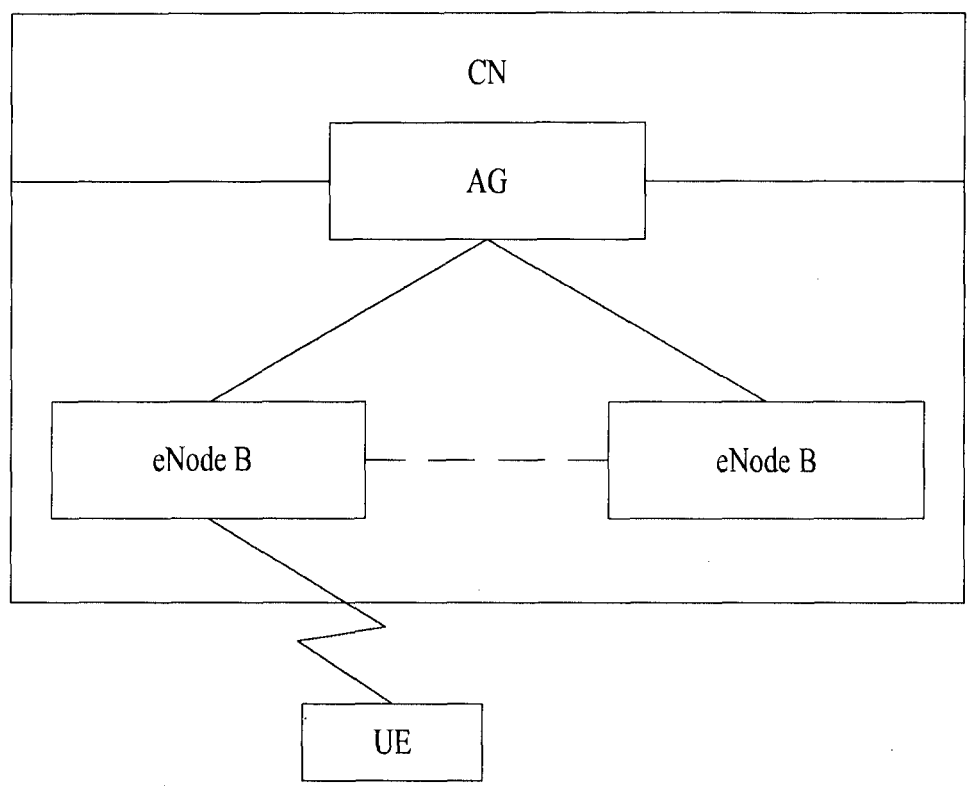
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
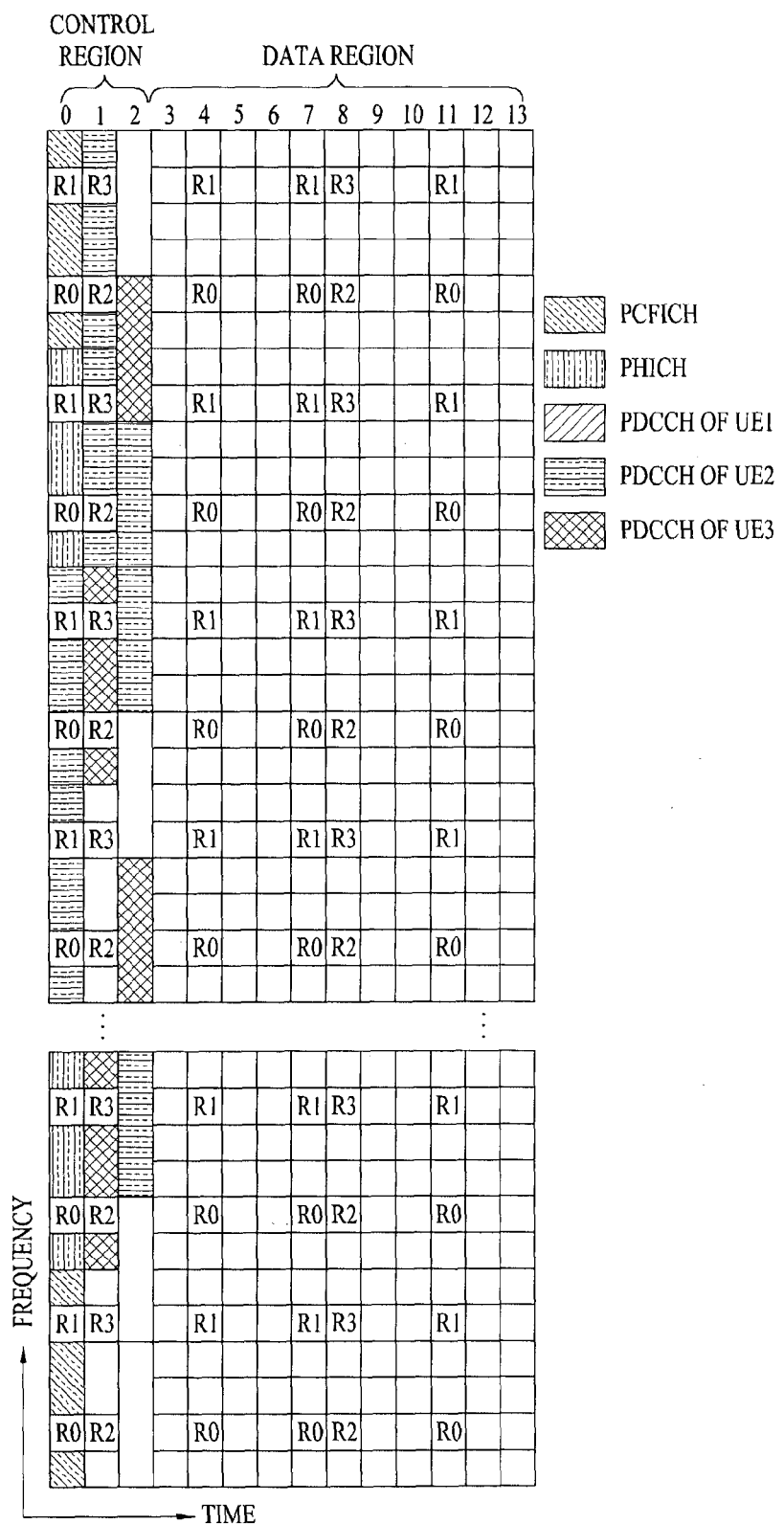
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
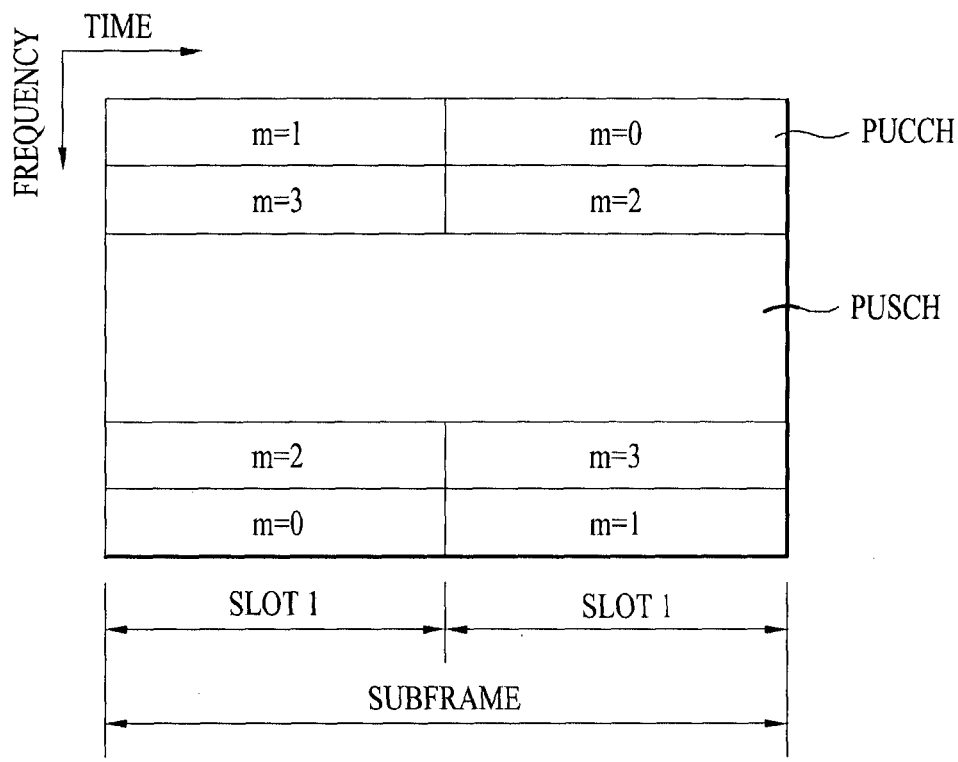
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
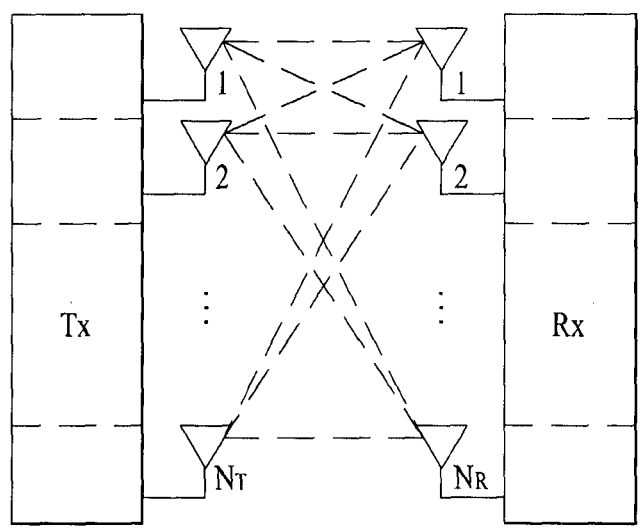
FIG. 7 illustrates a configuration of a general Multiple Input Multiple Output (MIMO) communication system.

FIG. 7 illustrates the configuration of a typical MIMO communication system. Referring to FIG. 7, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$
[Equation 5]

$$W\hat{s} = WPs$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R)$$ [Equation 6]

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R)$$ [Equation 7]

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
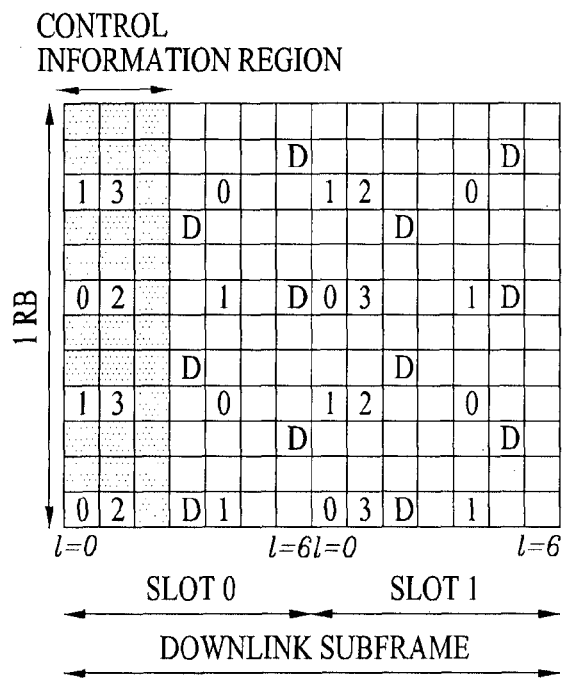
FIGS. 8 and 9 illustrate downlink Reference Signal (RS) configurations in an LTE system supporting downlink transmission through four antennas (4-Tx downlink transmission)
Figure 9:
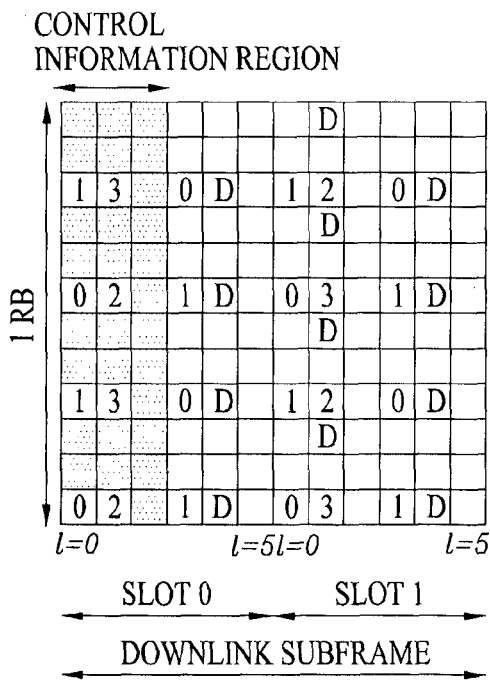

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
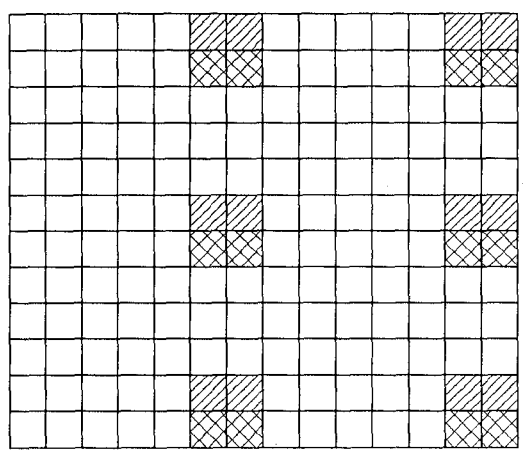
FIG. 10 illustrates an exemplary downlink Demodulation Reference Signal (DMRS) allocation defined in a current 3GPP standard specification.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| CSI reference signal Configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| CSI reference signal config-uration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
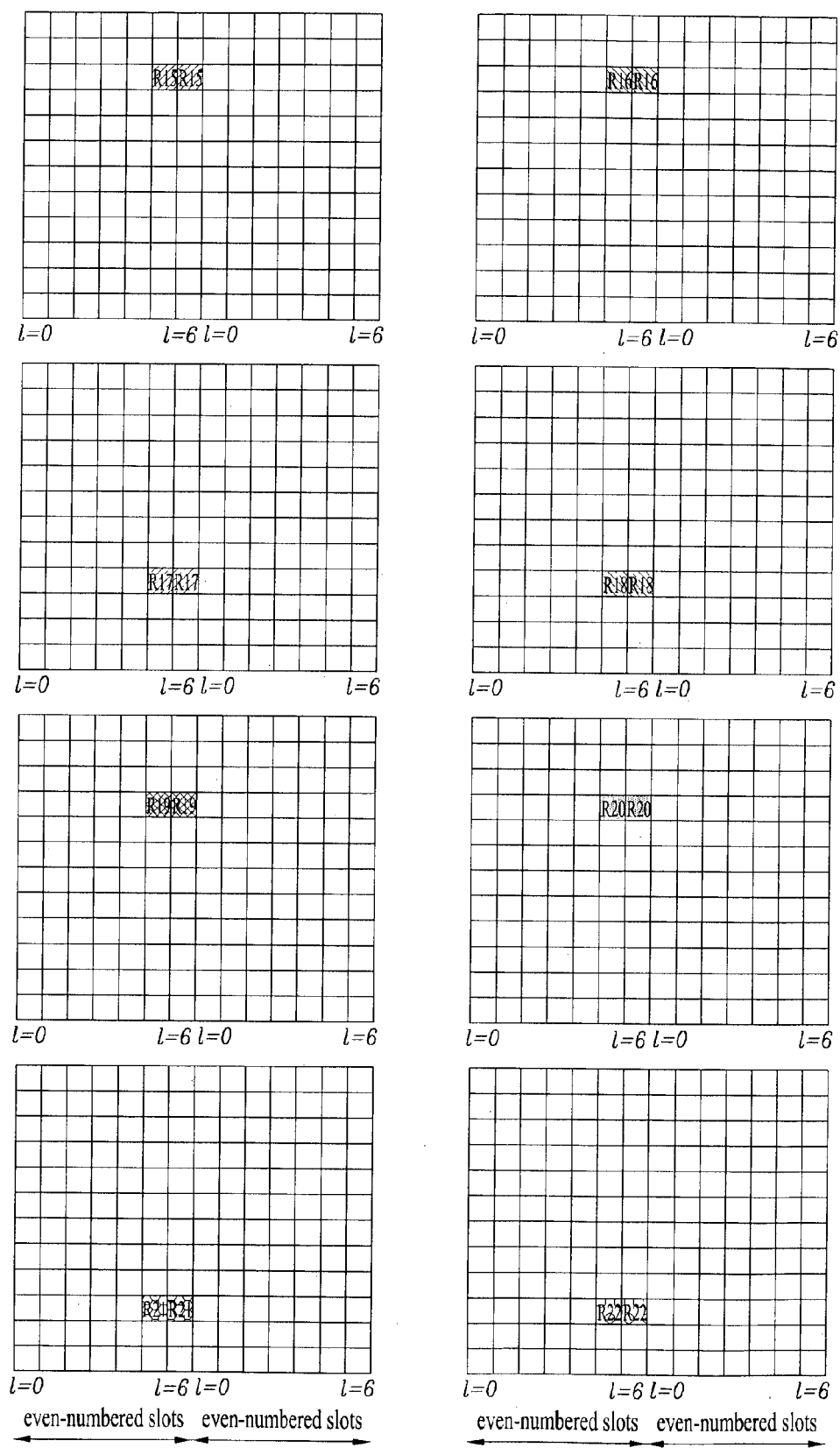
FIG. 11 illustrates Channel State Information-Reference Signal (CSI-RS) configuration #0 of downlink CSI-RS configurations defined in a current 3GPP standard specification.

In [Table 1] and [Table 2], (k',l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Information about a Zero Power (ZP) CSI-RS is transmitted in a CSI-RS-Config-r10 message configured as illustrated in [Table 4] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. That is, the current 3GPP standard defines a ZP CSI-RS only for four CSI-RS antenna ports.

TABLE 4

```
-- ASN1START
CSI-RS-Config-r10 ::=           SEQUENCE {
    csi-RS-r10                  CHOICE {
        ...
    }
    zeroTxPowerCSI-RS-r10       CHOICE {
        release                 NULL,
        setup                   SEQUENCE {
            zeroTxPowerResourceConfigList-r10    BIT STRING (SIZE
                                                 (16)),
            zeroTxPowerSubframeConfig-r10        INTEGER (0..154)
        }
    }
}
-- ASN1STOP
```

The current 3GPP standard defines modulation orders and cording rates for respective CQI indexes as illustrated in [Table 5].

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Hereinbelow, transmission modes for a DL data channel will be described.

A current 3GPP LTE standard specification, 3GPP TS 36.213 defines DL data channel transmission modes as illustrated in [Table 6] and [Table 7]. A DL data channel transmission mode is indicated to a UE by higher-layer signaling, that is, RRC signaling.

TABLE 6

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DGI format 2A | Large delay CDD or Transmit diversity |
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |

TABLE 6-continued

| Transmission mode | DCI format | Transmission scheme of PDSCH corresponding to PDCCH |
|---|---|---|
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2D | Up to 8 layer transmission, ports 7-14 or single-antenna port, port 7 or 8 |

TABLE 7

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Transmit diversity |
| Mode 4 | DCI format 1A | Transmit diversity |
| | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
| | DCI format 1 | Single-antenna port, port 5 |
| Mode 8 | DCI format 1A | Single-antenna port, port 7 |
| | DCI format 2B | Single-antenna port, port 7 or 8 |
| Mode 9 | DCI format 1A | Single-antenna port, port 7 |
| | DCI format 2C | Single-antenna port, port 7 or 8, |
| Mode 10 | DCI format 1A | Single-antenna port, port 7 |
| | DCI format 2D | Single-antenna port, port 7 or 8, |

Referring to [Table 6] and [Table 7], the 3GPP LTE standard specification defines DCI formats according to the types of RNTIs by which a PDCCH is masked. Particularly for C-RNTI and SPS C-RNTI, the 3GPP LTE standard specification defines transmission modes and DCI formats corresponding to the transmission modes, that is, transmission mode-based DCI formats as illustrated in [Table 6] and [Table 7]. DCI format 1A is additionally defined for application irrespective of transmission modes, that is, for a fall-back mode. [Table 6] illustrates transmission modes for a case where a PDCCH is masked by a C-RNTI and [Table 7] illustrates transmission modes for a case where a PDCCH is masked by an SPS C-RNTI.

Referring to [Table 6], if a UE detects DCI format 1B by blind-decoding a PDCCH masked by a C-RNTI, the UE decodes a PDSCH, assuming that the PDSCH has been transmitted in a single layer by closed-loop spatial multiplexing.

In [Table 6] and [Table 7], Mode 10 is a DL data channel transmission mode for CoMP. For example, in [Table 6], if the UE detects DCI format 2D by blind-decoding a PDCCH masked by a C-RNTI, the UE decodes a PDSCH, assuming that the PDSCH has been transmitted through antenna port 7 to antenna port 14, that is, based on DM-RSs by a multi-layer transmission scheme, or assuming that the PDSCH has been transmitted through a single antenna port, DM-RS antenna port 7 or 8.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An Active Antenna System (AAS) and Three-Dimensional (3D) beamforming will be described below.

In a legacy cellular system, an eNB reduces ICI and increases the throughput of UEs within a cell, for example, SINRs at the UEs by mechanical tilting or electrical tilting, which will be described below in greater detail.

Figure 12:
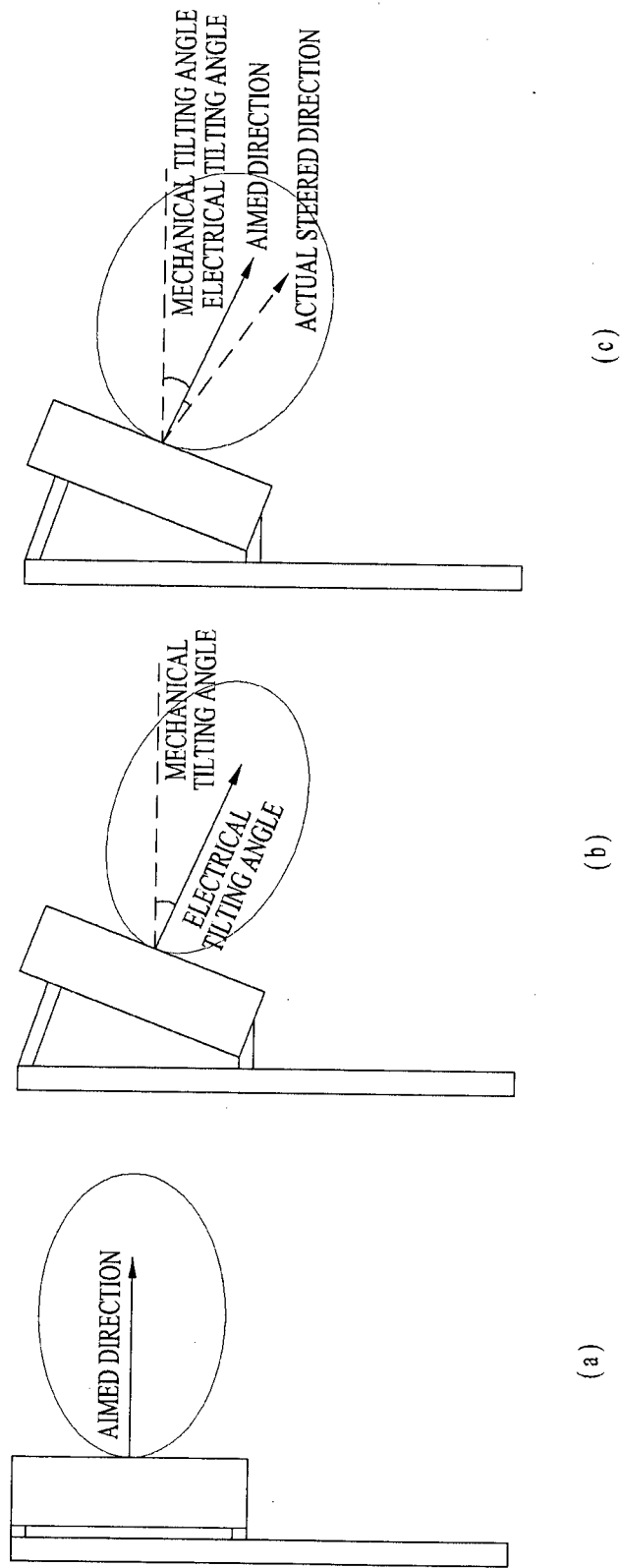
FIG. 12 illustrates antenna tilting schemes.

FIG. 12 illustrates antenna tilting schemes. Specifically, FIG. 12(a) illustrates an antenna configuration to which antenna tilting is not applied, FIG. 12(b) illustrates an antenna configuration to which mechanical tilting is applied, and FIG. 12(c) illustrates an antenna configuration to which both mechanical tilting and electrical tilting are applied.

A comparison between FIGS. 12(a) and 12(b) reveals that mechanical tilting suffers from a fixed beam direction at initial antenna installation as illustrated in FIG. 12(b). On the other hand, electrical tilting allows only a very restrictive vertical beamforming due to cell-fixed tilting, despite the advantage of a tilting angle changeable through an internal phase shifter as illustrated in FIG. 12(c).

Figure 13:
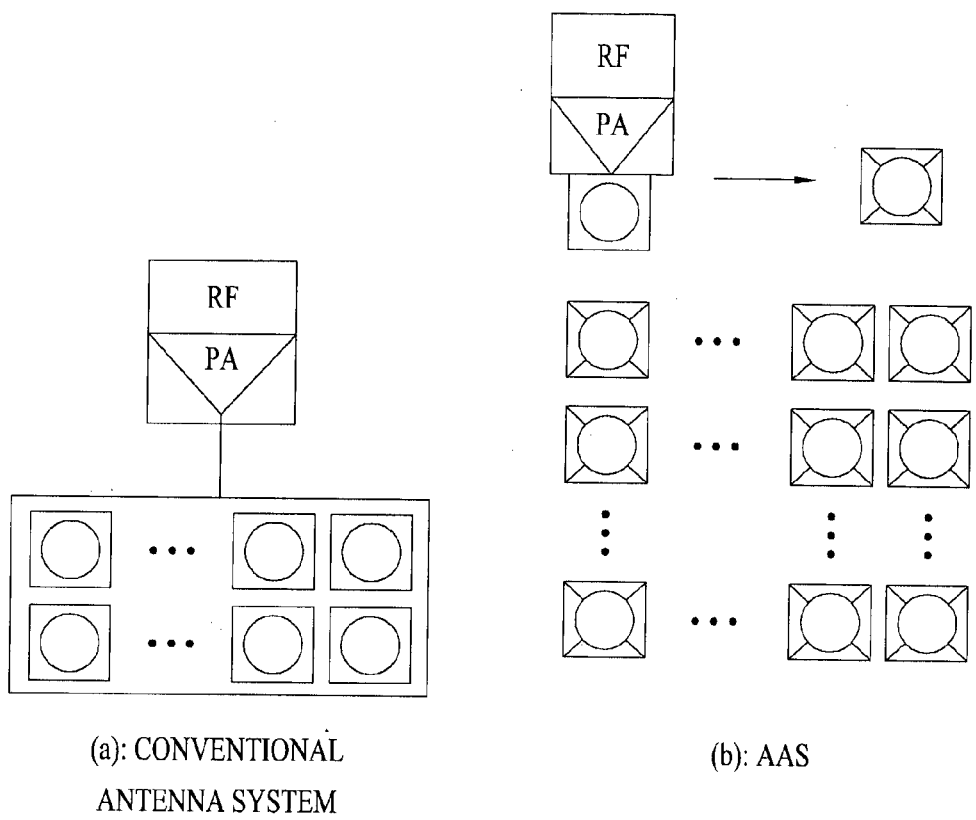
FIG. 13 is a view comparing an antenna system of the related art with an Active Antenna System (AAS)

FIG. 13 is a view comparing an antenna system of the related art with an AAS. Specifically, FIG. 13(a) illustrates the antenna system of the related art and FIG. 13(b) illustrates the AAS.

Referring to FIG. 13, as compared to the antenna system of the related art, each of a plurality of antenna modules includes a Radio Frequency (RF) module such as a Power Amplifier (PA), that is, an active device in the AAS. Thus, the AAS may control the power and phase on an antenna module basis.

In general, a linear array antenna (i.e. a one-dimensional array antenna) such as a ULA is considered as a MIMO antenna structure. A beam that may be formed by the one-dimensional array antenna exists on a Two-Dimensional (2D) plane. The same thing applies to a Passive Antenna System (PAS)-based MIMO structure. Although a PAS-based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved to an AAS, RF modules are configured independently even for vertical antennas. Consequently, vertical beamforming as well as horizontal beamforming is possible. This is called elevation beamforming.

The elevation beamforming may also be referred to as 3D beamforming in that available beams may be formed in a 3D space along the vertical and horizontal directions. That is, the evolution of a one-dimensional array antenna structure to a 2D array antenna structure enables 3D beamforming. 3D beamforming is not possible only when an antenna array is planar. Rather, 3D beamforming is possible even in a ring-shaped 3D array structure. A feature of 3D beamforming lies in that a MIMO process takes place in a 3D space in view of various antenna layouts other than existing one-dimensional antenna structures.

Figure 14:
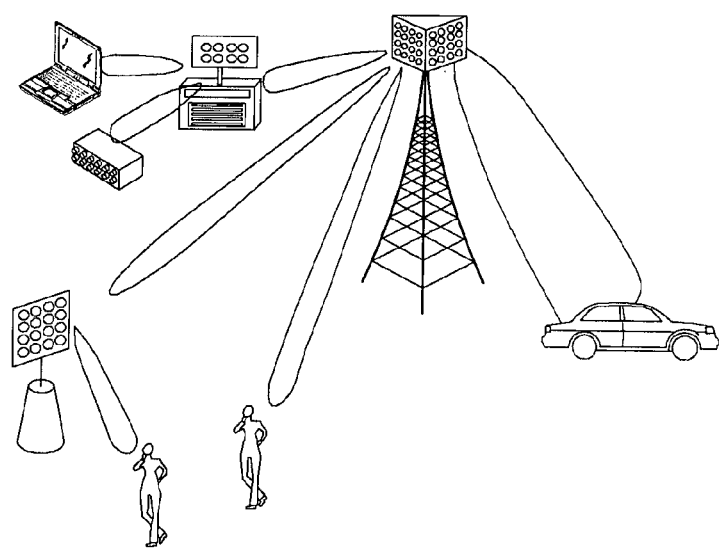
FIG. 14 illustrates an exemplary AAS-based User Equipment (UE)-specific beamforming.

FIG. 14 illustrates an exemplary UE-specific beamforming in an AAS. Referring to FIG. 14, even though a UE moves forward or backward from an eNB as well as to the left and right of the eNB, a beam may be formed toward the UE by 3D beamforming. Therefore, higher freedom is given to UE-specific beamforming.

Further, an outdoor to outdoor environment where an outdoor eNB transmits a signal to an outdoor UE, an Outdoor to Indoor (O2I) environment where an outdoor eNB transmits a signal to an indoor UE, and an indoor to indoor environment (an indoor hotspot) where an indoor eNB transmits a signal to an indoor UE may be considered as transmission environments using an AAS-based 2D array antenna structure.

Figure 15:
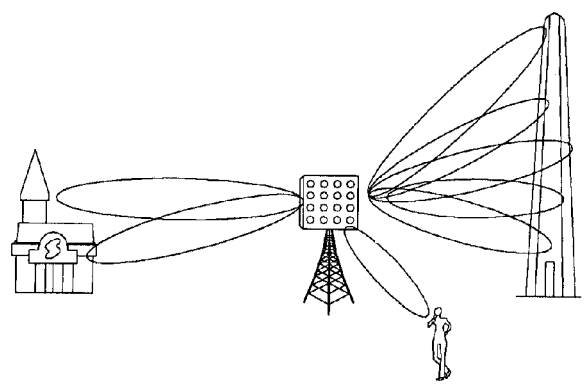
FIG. 15 illustrates an AAS-based two-dimensional beam transmission scenario.

FIG. 15 illustrates an AAS-based 2D beam transmission scenario.

Referring to FIG. 15, an eNB needs to consider vertical beam steering based on various UE heights in relation to building heights as well as UE-specific horizontal beam steering in a real cell environment where there are multiple buildings in a cell. Considering this cell environment, very different channel characteristics from those of an existing wireless channel environment, for example, shadowing/path loss changes according to different heights, varying fading characteristics, etc. need to be reflected.

In other words, 3D beamforming is an evolution of horizontal-only beamforming based on an existing linear one-dimensional array antenna structure. 3D beamforming refers to a MIMO processing scheme performed by extending to or combining with elevation beamforming or vertical beamforming using a multi-dimensional array antenna structure such as a planar array.

While the legacy LTE system was designed to support up to eight antennas arranged in a row, it is expected that more than eight antennas should be supported due to use of a 2D antenna array in the future. For example, a planar array with four by four antennas along horizontal and vertical directions has 16 (4×4) physical antennas. Although eight or fewer virtual antenna ports may be defined by grouping these physical antennas, the Degree of Freedom (DoF) in the spatial domain, brought by an increase in the number of antennas may not be fully utilized. Eventually the maximum number of antenna ports should be increased to 9 or larger in order to achieve maximum performance with a maxim DoF.

If the number of antenna ports is increased to 9 or larger, CSI measurement needs to be first considered. CRS and CSI-RS are RSs used for CSI measurement in the LTE system. The CRS supports only up to 4Tx transmission due to overhead. Accordingly, the CSI-RS with a small overhead is highly likely to be used continuously. Support of CSI-RS transmission through 9 or more antenna ports may be considered in two methods.

New CSI-RS resources for 9 or more as antenna ports (N=9 or larger) are defined. That is, as 4Tx CSI-RS resources are defined by extending 2Tx CSI-RS resources and 8Tx CSI-RS resources are defined by extending 4Tx CSI-RS resources according to the related art, 16Tx CSI-RS resources and further 35Tx CSI-RS resources are defined. Since new CSI-RS antenna ports with indexes other than the existing antenna port indexes 15 to 22 are defined, it is expected that the maximum number of antenna ports will be increased and definition of the new CSI-RS resources and definition of a signaling scheme for the new CSI-RS resources will affect the conventional standards significantly.

In this context, the present invention proposes that CSI-RS transmission through 9 or more antenna ports is supported using M (>1) Nm(≤8)-Tx CSI-RS resources. That is, CSI-RSs are transmitted through 8 or more antennas by configuring a plurality of CSI-RS resources within the conventional up to 8-Tx CSI-RS resources, for a single UE.

For example, if a specific node transmits CSI-RSs through 16 antenna ports, the CSI-RSs are transmitted through the CSI-RS antenna ports using two different 8-Tx CSI-RS resources. Specifically, given physical antennas 0 to 15, antennas 0 to 7 are mapped to antenna ports #0 to #7 of CSI-RS resource #1, whereas antennas 8 to 15 are mapped to antenna ports #0 to #7 of CSI-RS resource #2. Resource collision may be prevented by allocating different CSI-RS configuration numbers illustrated in [Table 1] and [Table 2] and/or different CSI-RS subframe offsets illustrated in [Table 3] between the CSI-RS resources.

Since there is no need for defining a CSI-RS for a new antenna port and a function of configuring a plurality of Non-Zero Power (NZP) CSI-RS resources for a UE is already provided, the present invention many minimize an influence on the conventional standards.

If multiple CSI-RS resources are allocated to a single UE according to the present invention, the afore-described QCL definition needs to be clarified more clearly.

Figure 16:
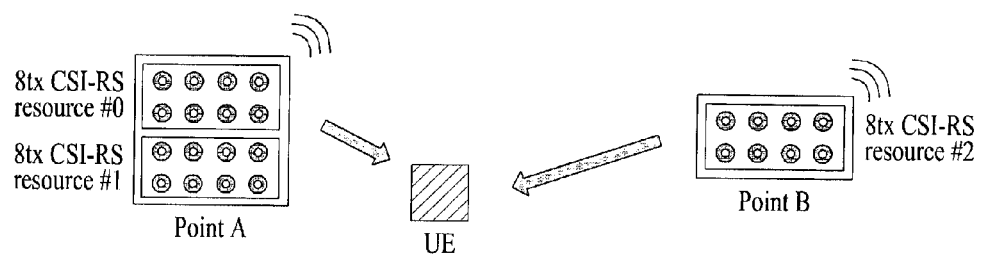
FIG. 16 illustrates an exemplary allocation of multiple Channel State Information Reference Signal (CSI-RS) resources to a single UE according to an embodiment of the present invention.

FIG. 16 illustrates an exemplary allocation of multiple CSI-RS resources to a single UE according to an embodiment of the present invention.

Referring to FIG. 16, it is noted that the same node, Point A transmits CSI-RS pattern #0 (or CSI-RS resource #0) and CSI-RS pattern #1 (or CSI-RS resource #1) and another node, Point B transmits CSI-RS pattern #2 (or CSI-RS resource #2), among three CSI-RS resources configured for a UE. If the UE receives a DL signal from Point B, a CSI-RS antenna port corresponding to CSI-RS resource #2 is quasi co-located with a DM-RS antenna port and thus the conventional QCL definition is still effective.

On the other hand, if the UE receives a DL signal from Point A, the UE cannot assume QCL between CSI-RS antenna ports corresponding to CSI-RS resource port #0 and CSI-RS resource port #1 and a DM-RS resource in the current LTE standard because the current LTE standard defines just QCL between a CSI-RS and a DM-RS or QCL between a CSI-RS and a CRS, thus allowing implicit determination of QCL between a DM-RS and a CRS, without defining QCL between a plurality of CSI-RSs.

Accordingly, the present invention configures a plurality of CSI-RS resources (or patterns) to support CSI-RS transmission through more than 8 antenna ports and provides a new QCL method based on the configured CSI-RS resources. First, based on the idea that antenna ports of a Plurality of CSI-RS resources transmitted from the same node or point are always quasi co-located physically as illustrated in FIG. 16, the present invention provides a method for indicating to a UE whether CSI-RS resources are quasi co-located with each other, when the configuring CSI-RS resources for a UE.

Embodiment 1

When configuring each CSI-RS resource for a UE, an eNB may indicate to the UE whether CSI-RS antenna ports of the CSI-RS resource satisfy a QCL condition with respect to CSI-RS antenna ports of another CSI-RS resource.

Thus, if the CSI-RS antenna ports of a specific CSI-RS resource and DM-RS antenna ports satisfy a QCL condition, the UE may assume that the CSI-RS antenna ports of another CSI-RS resource quasi co-located with the specific CSI-RS resource are also quasi co-located with the DM-RS antenna ports.

For example, in FIG. 16, the eNB indicates to the UE that 8 CSI-RS antenna ports of CSI-RS resource #0 are quasi co-located with 8 CSI-RS antenna ports of CSI-RS resource #1. In addition, the eNB may indicate to the UE that CSI-RS resource #2 is not quasi co-located with CSI-RS resource #0 and CSI-RS resource #1.

Specifically, an Information Element (IE) or field that defines a QCL index in relation to CSI-RS configuration may be added. That is, if the QCL indexes of two CSI-RS resources are identical, the CSI-RS antenna ports of the two CSI-RS resources are quasi co-located. If the QCL indexes of the two CSI-RS resources are different, the CSI-RS antenna ports of the two CSI-RS resources are not quasi co-located.

In other words, if the QCL indexes of the two CSI-RS resources are identical as is the case between CSI-RS resource #0 and CSI-RS resource #1 in FIG. 16, this implies that the CSI-RS antenna ports of the two CSI-RS resources are transmitted from the same node. On the contrary, if the QCL indexes of the two CSI-RS resources are different, this implies that the CSI-RS antenna ports of the two CSI-RS resources are transmitted from different nodes.

[Table 8] and [Table 9] illustrate examples of adding an IE that defines a QCL index in relation to CSI-RS configuration to a 3GPP standard specification, TS 36.331 according to the embodiment of the present invention.

TABLE 8

```
-- ASN1START
CSI-RS-ConfigNZP-r11 ::=            SEQUENCE {
    csi-RS-IdentityNZP-r11              CSI-RS-IdentityNZP-r11,
    antennaPortsCount-r11               ENUMERATED (an1, an2, an4, an8},
    resourceConfig-r11                  INTEGER (0..31),
    subframeConfig-r11                  INTEGER (0..154),
    scramblingIdentity-r11              INTEGER (0..503),
    qcl-identity                            qcl-identity
    qcl-CRS-Info-r11                    SEQUENCE {
        qcl-ScramblingIdentity-r11          INTEGER (0..503},
        crs-PortsCount-r11                  ENUMERATED {n1, n2, n4, spare1},
        mbsfn-SubframeConfig-r11            MBSFN-SubframeConfig  OPTIONAL   -- Need OR
    }                                                             OPTIONAL,  -- Need OR
    ...
}
-- ASN1STOP
```

TABLE 9

```
-- ASN1START
qcl-identity ::=        INTEGER (1..maxQCL-identity)
-- ASN1STOP
```

Referring to [Table 9], a QCL index may be set in a "qcl-identity" field, which may be an integer ranging from 1 to a maximum value, maxQCL-identity. The value of maxQCL-identity may be preset by a system or signaled by the eNB.

The QCL index may be included in CSI-RS-ConfigNZP IE or CSI-RS-IdentityNZP IE of an RRC message, indicating whether each NZP CSI-RS resources is quasi co-located, as illustrated in [Table 8]. Or the QCL index may be included in CSI-process IE or CSI-ProcessIdentity IE, indicating whether the CSI-RS antenna ports of each CSI process are quasi co-located.

Furthermore, a method for explicitly indicating a quasi co-located CSI-RS resource, a quasi co-located reference CSI-RS resource, or a base co-located reference CSI-RS resource may be considered. For example, when CSI-RS resource #1 is configured in FIG. 16, it may be explicitly indicated that CSI-RS resource #1 is quasi co-located with CSI-RS resource #0. This method may still use the CSI-RS-IdentityNZP IE or CSI-ProcessIdentity IE of the current RRC message.

That is, the index of an NZP CSI-RS resource or CSI process quasi co-located with a corresponding CSI-RS resource may be indicated. Specifically, the index of an NZP CSI-RS RS resources quasi co-located with a corresponding NZP CSI-RS resources may be added as CSI-RS-IdentityNZP in the CSI-RS-ConfigNZP IE, as illustrated in [Table 10]. In the absence of a quasi co-located CSI-RS resource or if the corresponding CSI-RS resource is a reference (or base) CSI-RS resource, the field may be omitted.

TABLE 10

```
-- ASN1START
CSI-RS-ConfigNZP-r11 ::=      SEQUENCE {
    csi-RS-IdentityNZP-r11        CSI-RS-IdentityNZP-r11,
    antennaPortsCount-r11         ENUMERATED {an1, an2, an4, an8},
    resourceConfig-r11            INTEGER (0..31),
    subframeConfig-r11            INTEGER (0..154),
    scramblingIdentity-r11        INTEGER (0..503),
    qcl-CSI-RS-IdentityNZP        CSI-RS-IdentityNZP-r11
    qcl-CRS-Info-r11              SEQUENCE {
        qcl-ScramblingIdentity-r11    INTEGER (0..503),
        crs-PortsCount-r11            ENUMERATED {n1, n2, n4, spare1},
        mbsfn-SubframeConfig-r11      MBSFN-SubframeConfig  OPTIONAL    -- Need OR
    }                                                       OPTIONAL,   -- Need OR
    ...
}
-- ASN1STOP
```

Embodiment 2

In the foregoing embodiment of the present invention, CSI-RS transmission through 9 or more CSI-RS antenna ports is supported by indicating the QCL relationship between CSI-RS resources. Compared to the forgoing embodiment of the present invention, this embodiment of the present invention proposes that a QCL type or QCL parameter set is added an existing QCL type or QCL parameter set is modified in order to reflect QCL between DM-RS antenna ports and CSI-RS antenna ports corresponding to a plurality of NZP CSI-RS resources.

In this embodiment of the present invention, QCL type A may be modified such that DM-RS antenna ports may be quasi co-located with CRS antenna ports and CSI-RS antenna ports corresponding to a plurality of CSI-RS resources. In the case of QCL type B, when a plurality of QCL parameter sets are defined by a higher-layer message, a QCL parameter set with DM-RS antenna ports quasi co-located with CSI-RS antenna ports corresponding to a plurality of CSI-RS resources may be newly defined, extended, or modified.

For example, a method for setting a plurality of CSI-RS resource-related IEs for QCL configuration by a high-layer message may be considered. [Table 11] illustrates IEs of a QCL configuration parameter set in a current LTE standard specification and [Table 12] illustrates a modified QCL configuration parameter set according to the embodiment of the present invention.

TABLE 11

```
PDSCH-RE-MappingQCL-Config-r11 ::=       SEQUENCE {
    pdsch-RE-MappingQCL-ConfigId-r11         PDSCH-RE-MappingQCL-ConfigId-r11,
    optionalSetOfFields-r11                  SEQUENCE {
        crs-PortsCount-r11                       ENUMERATED {n1, n2, n4 , spare1},
        crs-FreqShift-r11                        INTEGER (0..5),
        mbsfn-SubframeConfig-r11                 MBSFN-SubframeConfig    OPTIONAL,    -- Need
    OR
        pdsch-Start-r11                          ENUMERATED {reserved, n1, n2, n3, n4, assigned}
    }                                                                    OPTIONAL,    -- Need
    OP
        csi-RS-IdentityZP-r11                    CSI-RS-IdentityZP-r11,
        qcl-CSI-RS-IdentityNZP-r11               CSI-RS-IdentityNZP-r11  OPTIONAL,    -- Need
    OR
        ...
}
```

TABLE 12

```
PDSCH-RE-MappingQCL-Config-r11 ::=       SEQUENCE {
    pdsch-RE-MappingQCL-ConfigId-r11         PDSCH-RE-MappingQCL-ConfigId-r11,
    optionalSetOfFields-r11                  SEQUENCE {
        crs-PortsCount-r11                       ENUMERATED {n1, n2, n4, spare1},
        crs-FreqShift-r11                        INTEGER (0..5),
        mbsfn-SubframeConfig-r11                 MBSFN-SubframeConfig            OPTIONAL,    -- Need
    OR
        pdsch-Start-r11                          ENUMERATED {reserved, n1, n2, n3, n4, assigned}
    }                                                                            OPTIONAL,    -- Need
    OP
        csi-RS-IdentityZP-r11                    CSI-RS-IdentityZP-r11,
        qcl-CSI-RS-IdentityNZP-r11               SEQUENCE OF CSI-RS-IdentityNZP-r11  OPTIONAL, -- Need
    OR
        ...
}
```

Compared to [Table 11], it is noted from [Table 12] that "CSI-RS-IdentityNZP-r11" indicating one CSI-RS resource is replaced with "SEQUENCE OF CSI-RS-IdentityNZP-r11" indicating a plurality of CSI-RS resources, for QCL assumption.

Figure 17:
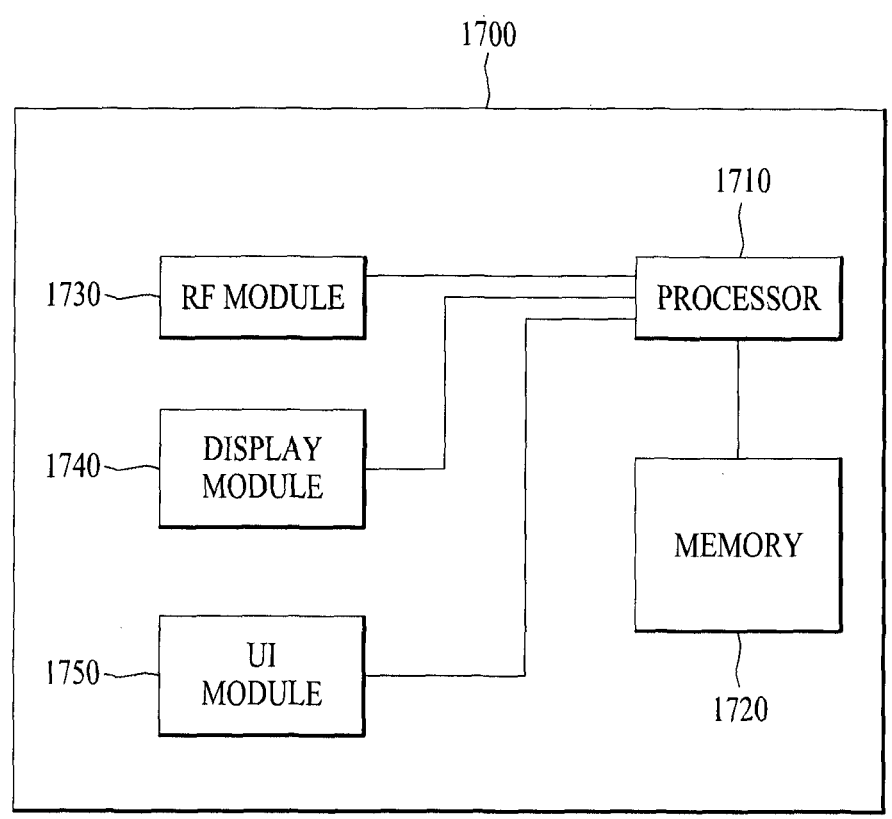
FIG. 17 is a block diagram of a communication apparatus according to an embodiment of the present invention.

FIG. 17 is a block diagram of a communication apparatus according to an embodiment of the present invention.

Referring to FIG. 17, a communication apparatus 1700 includes a processor 1710, a memory 1720, an RF module 1730, a display module 1740, and a User Interface (UI) module 1750.

The communication device 1700 is shown as having the configuration illustrated in FIG. 17, for the convenience of description. Some modules may be added to or omitted from the communication apparatus 1700. In addition, a module of the communication apparatus 1700 may be divided into more modules. The processor 1710 is configured to perform operations according to the embodiments of the present invention described before with reference to the drawings. Specifically, for detailed operations of the processor 1710, the descriptions of FIGS. 1 to 16 may be referred to.

The memory 1720 is connected to the processor 1710 and stores an Operating System (OS), applications, program codes, data, etc. The RF module 1730, which is connected to the processor 1710, upconverts a baseband signal to an RF signal or downconverts an RF signal to a baseband signal. For this purpose, the RF module 1730 performs digital-to-analog conversion, amplification, filtering, and frequency upconversion or performs these processes reversely. The display module 1740 is connected to the processor 1710 and displays various types of information. The display module 1740 may be configured as, not limited to, a known component such as a Liquid Crystal Display (LCD), a Light Emitting Diode (LED) display, and an Organic Light Emitting Diode (OLED) display. The UI module 1750 is connected to the processor 1710 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method and apparatus for configuring QCL between antenna ports for massive MIMO in a wireless communication system have been described in the context of a 3GPP LTE system. Besides, the present invention is applicable to many other wireless communication systems.

The invention claimed is:

1. A method for receiving a plurality of Channel State Information Reference Signals (CSI-RSs) at a User Equipment (UE) in a wireless communication system, the method comprising:

receiving higher layer signaling, which includes first information on a first CSI-RS resource configuration used for a first part of a plurality of antenna ports for the UE and second information on a second CSI-RS resource configuration used for a second part of the plurality of antenna ports; and receiving the plurality of CSI-RSs based on the first information and the second information from at least one node, wherein at least one of the first information and the second information includes quasi co-location information indicating whether the first part of the plurality of antenna ports and the second part of the plurality of antenna ports are quasi co-located with each other or not, wherein the first information includes a first quasi co-location index for the first CSI-RS resource configuration and the second information includes a second quasi co-location index for the second CSI-RS resource configuration, wherein if the first quasi co-location index and the second quasi co-location index have a same value, the UE considers that the first part of the plurality of antenna ports and the second part of the plurality of antenna ports are quasi co-located with each other, and wherein if the first quasi co-location index and the second quasi co-location index have different values, the UE considers that the first part of the plurality of antenna ports and the second part of the plurality of antenna ports are not quasi co-located with each other.

2. The method according to claim 1, wherein each of the first CSI-RS resource configuration and the second CSI-RS resource configuration supports a number of antenna ports that is less than or equal to 8, and a number of all of the plurality of antenna ports is larger than 8.

3. The method according to claim 1, wherein the first information includes a CSI-RS resource configuration index indicating the second CSI-RS resource configuration which is quasi co-located with the first CSI-RS resource configuration.

4. The method according to claim 1, wherein each of the plurality of antenna ports is a CSI-RS antenna port, where a number of all of the plurality of antenna ports is larger than 8.

5. A method for transmitting a plurality of Channel State Information Reference Signals (CSI-RSs) to a User Equipment (UE) by a network in a wireless communication system, the method comprising:
   transmitting higher layer signaling, which includes first information on a first CSI-RS resource configuration used for a first part of a plurality of antenna ports for the UE and second information on a second CSI-RS resource configuration used for a second part of the plurality of antenna ports, to the UE; and
   transmitting the plurality of CSI-RSs based on the first information and the second information to the UE through at least one node,
   wherein at least one of the first information and the second information includes quasi co-location information indicating whether the first part of the plurality of antenna ports and the second part of the plurality of antenna ports are quasi co-located with each other or not,
   wherein the first information includes a first quasi co-location index for the first CSI-RS resource configuration and the second information includes a second quasi co-location index for the second CSI-RS resource configuration,
   wherein if the first quasi co-location index and the second quasi co-location index have a same value, the UE considers that the first part of the plurality of antenna ports and the second part of the plurality of antenna ports are quasi co-located with each other, and
   wherein if the first quasi co-location index and the second quasi co-location index have different values, the UE considers that the first part of the plurality of antenna ports and the second part of the plurality of antenna ports are not quasi co-located with each other.

6. The method according to claim 5, wherein each of the first CSI-RS resource configuration and the second CSI-RS resource configuration supports a number of antenna ports that is less than or equal to 8, and a number of all of the plurality of antenna ports is larger than 8.

7. The method according to claim 5, wherein the first information includes a CSI-RS resource configuration index indicating the second CSI-RS resource configuration which is quasi co-located with the first CSI-RS resource configuration.

8. The method according to claim 5, wherein each of the plurality of antenna ports is a CSI-RS antenna port, where a number of all of the plurality of antenna ports is larger than 8.

* * * * *